3,780,073
Patented Dec. 18, 1973

3,780,073
3-OXIMES OF 19-NORTESTOSTERONE ESTERS

Arvin P. Shroff, Piscataway, N.J., assignor to Ortho Pharmaceutical Corporation
No Drawing. Continuation-in-part of applications Ser. No. 843,201, July 18, 1969, now Patent No. 3,629,415, and Ser. No. 193,174, Oct. 27, 1971, said application Ser. No. 843,201 being a division of application Ser. No. 635,308, Apr. 20, 1967, now Patent No. 3,532,689, which is a continuation-in-part of applications Ser. No. 502,384, Oct. 22, 1965, now abandoned, and Ser. No. 563,081, July 6, 1966, now Patent No. 3,437,674. This application Nov. 15, 1971, Ser. No. 198,992
Int. Cl. C07c *169/08*
U.S. Cl. 260—397.5                 8 Claims

ABSTRACT OF THE DISCLOSURE 3-oximes of 17-α-ethynyl 19-nortestosterone esters have post-coital activity for the suppression of reproduction.

---

This is a continuation-in-part of application Ser. No. 193,174, filed Oct. 27, 1971, and a continuation-in-part of application Ser. No. 843,201 filed July 18, 1969, now U.S. Pat. No. 3,629,415 which was in turn a division of application Ser. No. 635,308 filed Apr. 20, 1967, now Pat. No. 3,532,689 which was in turn a continuation-in-part of application Ser. No. 502,384 filed Oct. 22, 1965, now abandoned, and Ser. No. 563,081 filed July 6, 1966 now Pat. No. 3,437,674.

The novel compounds of the present invention are represented by the formula:

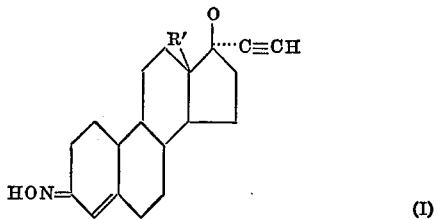

(I)

wherein R is alkanoyl of from 2 to 10 carbon atoms such as acetyl, propionyl, butyryl, pentanoyl, octanoyl, and the like, and R' is methyl or ethyl. The preferred compounds of the invention are those wherein R has more than 5 carbon atoms, such as caproyl, nonanoyl and decanoyl and R' is methyl. Alternatively, preferred compounds include those wherein R' is ethyl and R is acetyl.

The compounds of the invention possess valuable pharmacologic activity as antilittering agents, and more particularly, as agents for the suppression of reproduction when given post-coitally. They have also been found to be especially suitable as long acting compounds for the suppression of reproduction when administered parenterally, especially pre-coitally. They may be administered by any suitable parenteral means, intramuscular and sub-cutaneous being preferred.

The compounds of the invention are prepared by reacting a compound of the formula:

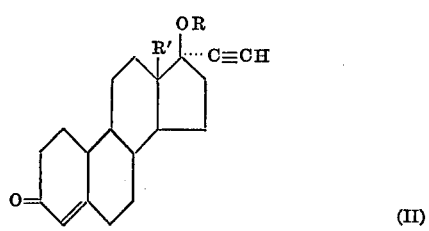

(II)

wherein
R and R' have the meaning given above, with a hydroxylamine salt in the presence of a base such as pyridine, sodium hydroxide or sodium acetate to form the corresponding 3-oxime.

Typical starting materials for the reaction are 17α-ethynyl-19-nortestosterone, which is disclosed in U.S. Pat. No. 2,774,777 and its esters. These compounds are known as ovulation suppressing agents which are used pre-coitally.

The following examples illustrate the invention:

EXAMPLE I

17α-ethynyl-17β-acetoxy-19-norandrost-4-en-3-one oxime

A solution of 2.0 g. of 17α-ethynyl-17β-acetoxy-19-norandrost-4-en-3-one, 10 ml. of pyridine and 1.0 g. of hydroxylamine hydrochloride is heated on a steam bath for one-half hour. The mixture is poured into a large amount of ice and water and the solid thus separated is collected by filtration. It is recrystallized from methanol-water to give 1.6 g. (78%) of 17α-ethynyl-17β-acetoxy-19-norandrost-4-en-3-one oxime, M.P. 229–230°.

λ max. 238 mμ.

Calcd. for $C_{22}H_{29}NO_3$ (percent): C, 74.33; H, 8.22; N, 3.94. Found (percent): C, 74.39; H, 8.21; N, 4.01.

EXAMPLE II

17β-caprolyloxy-17α-ethynyl-19-norandrost-4-ene-3-one oxime

17α-ethynyl-19-norandrost-4-en-17β-ol-3-one (1.0 g.) is heated with 10 ml. of pyridine and 300 mg. of hydroxylamine hydrochloride on a steam bath for two hours. The solution is poured over a large amount of water and the precipitates thus formed are collected by filtration. Recrystallization from methanol gives 17α-ethynyl-19-norandrost-4-en-17β-ol-3-one oxime, M.P. 112–114°.

Calcd. for $C_{26}H_{37}NO_3$ (percent): C, 75.87; H, 9.06; N, 3.40. Found (percent): C, 75.66; H, 9.21; N, 3.14.

EXAMPLE III

17β-propionyloxy-17α-ethynyl-19-norandrost-4-en-3-one oxime

Following the procedure of Example I, but starting with 17β-caproyloxy-17α-ethynyl-19-norandrost-4-en-3-one, there is obtained 17β-caproyloxy-17α-ethynyl-19-norandrost-4-en-one oxime, M.P. 75–76°.

Calcd. for $C_{26}H_{37}NO_3$ (percent): C, 75.87; H, 9.06; N, 3.40. Found (percent): C, 75.66; H, 9.21; N, 3.14.

EXAMPLE IV

17β-decanoyloxy-17α-ethynyl-19-norandrost-4-en-3-one oxime

Following the procedure of Example I, but starting with 17β-propionyloxy-17α-ethynyl-19-norandrost-4-en-3-one there is obtained 17β-propionyloxy-17α-ethynyl-19-norandrost-4-en-3-one oxime, M.P. 100–101°.

Calcd. for $C_{23}H_{31}NO_3$ (percent): C, 74.76; H, 8.46; N, 3.79. Found (percent): C, 74.78; H, 8.65; N, 3.17.

EXAMPLE V

17β-decanoyloxy-17α-ethnyl-19-norandrost-4-en-3-one oxime

Following the procedure of Example I, but starting with 17β-decanoyloxy-17α-ethynyl-19-norandrost-4-en-3-one, there is obtained 17β-decanoyloxy-17α-ethynyl-19-norandrost-4-en-3-one oxime, M.P. 128–129.5°.

Calcd. for $C_{30}H_{45}NO_3$ (percent): C, 77.04; H, 9.70; N, 3.00. Found (percent): C, 77.12; H, 9.87; N, 3.27.

In like manner there are prepared:

17α-ethynyl-13β-ethyl-gon-4-en-17β-ol-3-one oxime,
17α-ethynyl-17β-caproyloxy-13β-ethyl-gon-4-en-3-one oxime, and
17α-ethynyl-17β-decanoyloxy-13β-ethyl-gon-4-en-3-one oxime.

EXAMPLE VI

N,17β-diacetoxy-17α-ethynyl-19-norandrost-4-en-3-one oxime acetoxy-19-norandrost-4-en-3-one oxime in 5.0 ml. of pyridine is treated with 9.08 ml. of acetic anhydride and stirred at room temperature for 15 minutes. The mixture is poured into a large amount of ice and water and neutralized with ammonium hydroxide. The solid portion is collected by filtration, dried and recrystallized from hexane to give N,17β-diacetoxy-17α-ethynyl-19-norandrost-4-en-3-one oxime, M.P. 142–144° C.

$\lambda_{max.}^{EtOH}$ 243 mμ.

Calcd. for $C_{24}H_{31}NO_4$ (percent): C, 72.51; H, 7.86; N, 3.52. Found (percent): C, 72.54; H, 8.01; N, 3.73.

EXAMPLE VII

N-iso-butyryloxy-17β-acetoxy-17α-ethynyl-19-norandrost-4-en-3-one oxime

A solution containing 3.0 g. of 17α-ethynyl-17β-acetoxy-19-norandrost-4-en-3-one oxime in 10 ml. of pyridine is treated with 10 ml. of isobutyric anhydride. The mixture is stirred at room temperature for 15 minutes, and poured into a large amount of ice and water. The semisolid material is extracted with ethyl acetate and the organic layer is washed with water, dried over sodium sulfate and evaporated. The solid is recrystallized from hexane to give N-isobutyryloxy-17β-acetoxy-17α-ethynyl-19-norandrost-4-en-3-one oxime, M.P. 150–151° C.

$\lambda_{max.}^{EtOH}$ 244 mμ.

Calcd. for $C_{28}H_{35}NO_4$ (percent): C, 73.38; H, 8.29; N, 3.29. Found (percent): C, 73.31; H, 8.31; N, 3.53.

EXAMPLE VIII

N-propionyloxy-17β-acetoxy-17α-ethynyl-19-norandrost-4-en-3-one oxime

Following the procedure of Example VI or VII, but using propionic anhydride as the esterifying agent, N-propionyloxy-17β-acetoxy-17α-ethynyl-19-norandrost-4-en-3-one oxime is recrystallized from hexane, M.P. 152–154° C.

$\lambda_{max.}^{EtOH}$ 244 mμ.

Calcd. for $C_{25}H_{33}NO_4$ (percent): C, 72.96; H, 8.08; N, 3.40. Found (percent): C, 72.69; H, 8.24; N, 3.49.

EXAMPLE IX

N-caproyloxy-17β-acetoxy-17α-ethynyl-19-norandrost-4-en-3-one oxime

Following the procedure of Example I or II, but using caproic anhydride as the esterifying agent, N-caproyloxy-17β-acetoxy-17α-ethynyl-19-norandrost-4-en-3-one oxime is recrystallized from hexane, M.P. 102–104°.

$\lambda_{max.}^{EtOH}$ 243 mμ.

Calcd. for $C_{28}H_{39}NO_4$ (percent): C, 74.14; H, 8.67; N, 3.09. Found (percent): C, 74.03; H, 8.55; N, 3.33.

EXAMPLE X

N-acetoxy-17β-caproyloxy-17α-ethynyl-19-norandrost-4-en-3-one oxime

Following the procedure of Example VI, but starting with 17β-caproyloxy-17α-ethynyl-19-norandrost-4-en-3-one oxime, there is obtained N-acetoxyl-17β-caproyloxy-17α-ethynyl-19-norandrost-4-en-3-one oxime, M.P. 110–112°.

Calcd. for $C_{28}H_{39}NO_2$ (percent): C, 74.14; H, 8.69; N, 3.13. Found (percent): C, 74.10; H, 8.69; N, 3.13.

EXAMPLE XI

N-(2'-tetrahydropyranyloxy)-17β-acetoxy-17α-ethynyl-19-norandrost-4-en-3-one oxime 17β-acetoxy-17α-ethynyl-19-norandrost-4-en-3-one oxime (0.5 g.) is treated with 20.0 ml. of dry benzene, 0.2 g. of p-toluenesulfonic acid and 10 ml. of dihydropyran and is stirred at room temperature for 0.5 hour. The mixture is treated with a large amount of ice and water followed by extraction with ethyl acetate. The organic layer is dried over sodium sulfate and evaporated. Repeated crystallization from methylene chloride-hexane gives N-(2'-tetrahydropyranyloxy)-17β-acetoxy-17α-ethynyl-19-norandrost-4-en-3-one oxime, M.P. 172–174°.

Calcd. for $C_{27}H_{37}NO_4$ (percent): C, 73.77; H, 8.48; N, 3.19. Found (percent): C, 74.08; H, 8.32; N, 3.45.

EXAMPLE XII

DL-13β-ethyl-17α-ethynyl-17β-acetoxy-gon-4-en-3-one oxime

A solution containing 4.5 g. of DL-13β-ethyl-17α-ethynyl-17β-acetoxy-gon-4-en-3-one in 15 ml. of pyridine and 2.0 g. of hydroxylamine hydrochloride is heated on a steam bath for 45 minutes. It is cooled and poured into a large amount of ice and water. The solid material thus formed is collected by filtration and air dried. It is recrystallized from methylene chloride-alcohol mixture to give 4.2 g. of DL-13β-ethyl-17α-ethynyl-17β-acetoxy-gon-4-en-3-one oxime, M.P. 226–228°.

Calcd. for $C_{23}H_{31}NO_3$ (percent): C, 74.76; H, 8.46; N, 3.79. Found (percent): C, 74.84; H, 8.75; N, 3.90.

In like manner there are prepared:

N,17β-diacetoxy-17α-ethynyl-13β-ethyl-gon-4-en-3-one oxime,
N-iso-butyryloxy-17β-acetoxy-17α-ethynyl-13β-ethyl-gon-4-en-3-one oxime,
N-propionyloxy-17β-acetoxy-17α-ethynyl-13β-ethyl-gon-4-en-3-one oxime,
N-caproyloxy-17β-acetoxy-17α-ethynyl-13β-ethyl-gon-4-en-3-one oxime,
N-acetoxy-17β-caproyloxy-17α-ethynyl-13β-ethyl-gon-4-en-3-one oxime, and
N-(2'-tetrahydropyranyloxy)-17β-acetoxy-17α-ethynyl-13β-ethyl-gon-4-en-3-one oxime.

The antilittering effect of a compound is determined by the following procedure:

(1) The compound to be tested is administered in the diet or by gavage for 7 days to both male and female rats, with the sexes segregated.
(2) Treatment is continued for 15 days during which the rats are permitted to cohabit freely.
(3) The sexes are again segregated and are observed for 21 days with no treatment.

A control group is similarly treated except that the compound is not administered.

The females are observed for pregnancies and the size of litters.

The minimum effective dose (MED) is the amount of the compound in milligrams per kilogram of animal body weight per day (mg./kg./day), which completely suppresses the production of litters.

TABLE I

| Compound administered: | MED mg./kg./day |
|---|---|
| 17α-ethynyl-17β-acetoxy-19-norandrost-4-en-3-one oxime | 0.25 |
| 17α-ethynyl-19-norandrost-4-en-17β-ol-3-one oxime | 0.25 |
| N,17β-diacetoxy-17α-ethynyl-19-norandrost-4-en-3-one oxime | 0.25 |
| N-propionyloxy-17β-acetoxy-17α-ethynyl-19-norandrost-4-en-3-one oxime | 1.00 |
| N-isobutyryloxy-17β-acetoxy-17α-ethynyl-19-norandrost-4-en-3-one oxime | 1.00 |
| N-caproyloxy-17β-acetoxy-17α-ethynyl-19-norandrost-4-en-3-one oxime | 1.00 |
| N-(2'-tetrahydropyranyloxy)-17β-acetoxy-17α-ethynyl-19-norandrost-4-en-3-one oxime | 0.5 |
| 17β-caproyloxy-17α-ethynyl-19-norandrost-4-en-3-one oxime | 0.25 |
| 17β-propionyloxy-17α-ethynyl-19-norandrost-4-en-3-one oxime | 0.25 |
| 17α-ethynyl-19-nortestosterone | 20.0 |
| 17α-ethynyl-17β-acetoxy-19-nortestosterone | 5.0 |

It will be observed from Table I above that 17α-ethynyl-17β-acetoxy-19-norandrost-4-en-3-one oxime eliminates the production of litters in rats at a dose of 0.25 mg. per kilogram of body weight per day, while a daily dosage of 5.0 mg./kilogram of body weight of its precursor 17α-ethynyl-17β-acetoxy-19-nortestosterone is required to accomplish the total suppression of litters. It will also be observed that 0.25 mg. per kilogram of body weight per day of 17α-ethynyl-19-norandrost-4-en-17β-ol-3-one oxime totally suppresses rat litters while 20.0 mg. per kilogram of body weight per day of its precursor 17α-ethynyl-19-nortestosterone is required to accomplish total suppression of rat litters. It will further be observed that 0.25 mg./kg. of body weight/day of 17β-caproyloxy and 17β-propionyloxy-17α-ethynyl-19-norandrost-4-en-3-one oxime compounds of the invention are sufficient to accomplish total suppression of rat litters.

In order to determine the post-coital effect of a compound, female rats of the Wistar strain are fed a compound by gavage on specific days of gestation after sperm are observed in the vagina. The rats are sacrificed and the uteri are examined for implantation and resorbtion sites.

In the following table, day 0 is the day on which sperm is observed in vaginal washings and the compound tested was 17α-ethynyl-17β-acetoxy-19-norandrost-4-en-3-one oxime.

TABLE II

| Dose (mg./kg.) | Day of administration | Pregnant/total | Implantations Normal | Resorbed |
|---|---|---|---|---|
| 10 | 0 | 6/10 | 25 | 3 |
| 10 | 1 | 0/5 | 0 | 0 |
| 10 | 2 | 0/5 | 0 | 0 |
| 10 | 3 | 1/5 | 7 | 2 |
| 10 | 4 | 1/5 | 0 | 11 |
| 5 | 1 | 1/5 | 0 | 2 |
| 5 | 2 | 0/5 | 0 | 0 |
| 1 | 1 | 4/5 | 30 | 3 |
| 1 | 2 | 4/5 | 12 | 2 |
| 20 | 0 | 2/5 | 0 | 12 |
| 40 | 0 | 1/5 | 0 | 1 |

It will be observed from Table II that in the species treated, the compound was most efficacious at dose levels of 10 mg./kg. and 5 mg./kg. on days 1 and 2 of pregnancy.

It is believed that the compounds of the invention act post-coitally by lysing the zygote and that this action is most effective from between 36 to 60 hours after fertilization of the ovum.

In order to determine the long acting nature of the compounds of this invention, female rats are given a single dose sub-cutaneously of the compound in sesame oil (10 mg./ml.) 7 days before permitting cohabitation. The compound can also be administered intramuscularly. The sexes are then permitted to cohabit freely for the number of days indicated in Table III below. They are then segregated for up to 3 weeks and observed for the production of litters. The day pregnancy occurred (DPO) is then back calculated from the day of parturition.

TABLE III

| R | Dose, mg./kg. | DPO, mean | Range | No. litters/ No. rats treated | Days cohabited |
|---|---|---|---|---|---|
| Caproyl | 25 | 70 | 70 | 1/10 | 91 |
| Decanoyl | 25 | 41 | 5-83 | 5/10 | 92 |
| Acetyl | 25 | 14 | 8-21 | 7/10 | 28 |
| Propionyl | 25 | 8 | 7-9 | 3/9 | 15 |
| Do | 25 | 9.3 | 5-13 | 3/10 | 15 |

It will be observed from the above data that the compounds of the invention and especially those wherein R is caproyl or decanoyl exhibit activity of long duration against reproduction. For example, for the caproyl compound, wherein cohabitation existed for 91 days only one rat of 10 had a litter, the pregnancy for which occurred 70 days after cohabitation began and 77 days after administration of the compound. The decanoyl compound is effective to suppress reproduction for an average of 41 days after cohabitation in the rats tested while half the rats did not become pregnant at all. These data show the long acting nature of the compounds in suppressing reproduction. Similar conclusions may be drawn from the data on the acetyl and propionyl compounds. The range figure given indicates the earliest and latest days on which pregnancy occurred.

In contrast to the results obtained from treated animals as described in Table III, it should be noted that results obtained over a long period of time from rats permitted to cohabitate without the administration of any anti-reproductive compounds show that 90% of the female rats became pregnant within a range of 1-8 days after cohabitation with a mean DPO of four days.

What is claimed is:
1. A compound of the formula:

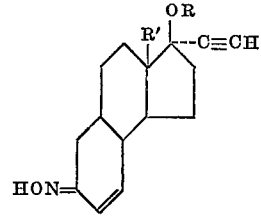

wherein R is alkanoyl of from 2 to 10 carbon atoms and R' is methyl or ethyl.
2. The compound of claim 1 wherein R' is methyl.
3. The compound of claim 2 wherein R is caproyl.
4. The compound of claim 2 wherein R is acetyl.
5. The compound of claim 2 wherein R is propionyl.
6. The compound of claim 2 wherein R is decanoyl.
7. The compound of claim 1 wherein R' is ethyl.
8. The compound of claim 7 wherein R is acetyl.

References Cited
UNITED STATES PATENTS

| 3,060,205 | 10/1962 | Schwenk et al. | 260—397.5 |
| 3,211,756 | 10/1965 | Mazur | 260—397.1 |
| 3,299,107 | 1/1967 | Mazur | 260—397.5 |
| 3,374,230 | 3/1968 | Gardner et al. | 260—239.55 |

HENRY A. FRENCH, Primary Examiner

U.S. Cl. X.R.
424—238

PC-1050
(5/69)

UNITED STATES PATENT OFFICE
CERTIFICATE OF CORRECTION

Patent No. 3,780,073          Dated December 18, 1973

Inventor(s) Arvin P. Shroff

It is certified that error appears in the above-identified patent and that said Letters Patent are hereby corrected as shown below:

In Column 1, Formula 1,  should read ---  ---

In Column 2, line 30, "17β-caproyloxy" should read --- 17α-ethynyl-19-norandrost-4-en-17β-ol-3-one oxime ---.

In Column 2, line 44, "17β-propionyloxy-17α-ethynyl" should read --- 17β-Caproyloxy-17α-ethynyl ---.

In Column 2, line 55, "17-β-decanoyloxy-17α-ethynyl" should read --- 17β-Propionyloxy-17α-ethynyl ---.

In Column 3, lines 13 and 14, " A solution containing 3.0g of 17α-ethynyl-17β " should be inserted before "acetoxy -19-norandrost-4-en-3-one".

In Column 6, Claim 1,

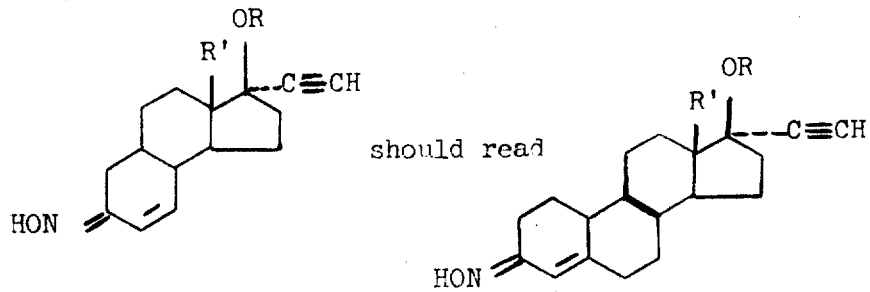

Signed and sealed this 21st day of May 1974.

(SEAL)
Attest:

EDWARD M. FLETCHER, JR.        C. MARSHALL DANN
Attesting Officer              Commissioner of Patents